Patented May 28, 1935

2,002,794

UNITED STATES PATENT OFFICE 2,002,794

PROCESS FOR THE PRODUCTION OF KETONES

Wilhelm Querfurth, Constance, Germany, assignor to Deutsche Gold- und Silber-Scheideanstalt vormals Roessler, Frankfort-on-the-Main, Germany, a corporation of Germany No Drawing. Application May 6, 1932, Serial No. 609,763. In Germany January 29, 1929

18 Claims. (Cl. 260—134)

The present invention relates to the production of ketones from aliphatic alcohols with two or more C-atoms combined together or the derivatives of the corresponding alcohols, such as, for example, aldehydes, esters, ethers, acetals and so forth.

According to earlier methods of the applicant, it has been possible to convert bodies of the character above referred to into ketones by the action of water vapor at higher temperatures in the presence of catalysts. As catalysts, metal oxygen compounds, preferably mixtures of different metal oxygen compounds, for example, those of heavy metals such as iron oxide, and of light metal such as for example, oxides of the alkaline earth metals in the presence or absence of metals, for example of iron, have been used.

Further experiments have shown that the use of oxygen compounds of nickel and cobalt up to 20% affords particular advantages in the ketonizing of initial substances of the character referred to. Preferably the said oxygen compounds, for example nickel oxide, or substances containing the same, in combination with other oxygen compounds of metals, for example those of the sixth, seventh and eighth groups, of the periodic system, are used if desired with the cooperation of metals, which latter can be used with advantage as carriers for the metal oxygen compounds.

It has been shown that iron oxides which have proved particularly good ketonizing catalysts can be further considerably improved by the cooperation of, for example nickel oxide, cobalt oxide, or both.

A catalyst according to the invention may be prepared as follows: Spongy iron having a large surface is thoroughly rusted over by exposure in damp air, preferably moistened with weak acetic acid and then saturated with a solution of commercial nickel carbonate in acetic acid, dried, and thereupon subjected to a subsequent heating to high temperatures, for example 500° C. It is thus possible to use for example nickel carbonate equal to about 10 per cent of the weight of the spongy iron. Likewise it is possible, to start with spongy iron which by treatment with water vapor or, if desired, with mixtures of water vapor and air, or also with atmospheric oxygen alone at such temperatures has been more or less thoroughly or completely oxidized throughout and to apply auxiliary catalysts such as for example, nickel oxide, cobalt oxide, or both to this basic catalytic body. It is possible to use commercial nickel carbonate containing cobalt for the production of the catalysts.

The applicant has shown in his earlier methods that catalytically-acting heavy metal oxides can be considerably improved by the addition of other metal oxides, in particular light metal oxides such as those of the alkaline earth metals or auxiliary catalysts.

Comparative experiments have shown that catalysts which have been prepared with the cooperation of oxygen compounds of nickel and cobalt, such as the previously described iron oxide-nickel oxide catalysts, surpass under many conditions those which are produced from iron oxide with the cooperation of alkaline earth oxides, such as calcium oxide.

The catalysts prepared according to the invention act extraordinarily energetically, so that, by use of the same, the ketonizing of the reaction mixture is completed more rapidly than when using corresponding iron oxide-calcium oxide-catalysts. A further advantage resides therein that the operation can be carried out at lower temperatures. Comparative experiments have shown that ketonizing with the use of the above catalysts can be carried out at 425 to 490° C., whilst for the ketonizing of corresponding quantities of initial substances with the use of iron oxide-calcium oxide-catalysts temperatures of 510° to 580° C. were required. The possibility of working at lower temperatures has the advantage that by this means certain side reactions can be repressed or obviated, an advantage which is of particular importance when initial substances containing admixtures such as occasionally occur in practice are treated.

Example

A mixture of 18,830 kg. of ethyl alcohol and 78,400 kg. of water-vapor is conducted at an average velocity of 78.5 kg. of ethyl alcohol and 326 kg. of water-vapor per hour over a catalyst prepared according to the above details by rusting of spongy iron in air and impregnating with a solution of commercial nickel carbonate in acetic acid. 9510 kg. of acetone are obtained, which corresponds to a yield of 88.0 per cent, whilst 1,680 kg. of unchanged ethyl alcohol are recovered.

It has been shown that the catalysts of the character claimed herein act particularly favorably in the treatment of initial substances which do not constitute pure alcohols or pure aldehydes, such as esters of various kinds, with first runnings of spirit rectification which may contain bodies such as methanol, ethyl alcohol, esters of these alcohols, acetaldehydes, acetals and para-aldehyde, side by side, further, in the treatment of high boiling esters of residual acids such as propionic acid, butyric acid, and similar esters, whilst in the latter case besides acetone, the corresponding higher ketones are formed, in part also in the form of mixed ketones, such as methyl-ethyl ketone, methyl-propyl ketone, and so forth. The presence of oxygen compounds of nickel or cobalt in amounts not exceeding 20% have been shown to be particularly favorable in the treatment or co-treatment of substances which cannot be directly ketonized. The same also insures the production of good yields with the avoidance of disturbing side reactions in the treatment of such initial substances.

The nickel oxide, cobalt oxide, or both, to be used according to the invention in combination with other metal oxides, for example those of iron, various other metal oxides such as iron oxide and manganese oxide or catalysts containing iron oxide and calcium oxide, can also be used in combination with catalysts which are free from nickel oxide such as iron oxide-calcium oxide-iron catalyst. This may be effected in that individual parts of the contact chamber, namely, those heated to low temperatures are charged with nickel-containing catalyst, whilst the remainder of the contact chamber, heated to higher temperatures, is charged with, for example catalysts containing iron oxide and calcium oxide. The operation may also be such that contact chambers which are charged with different catalysts are arranged one behind the other in such a manner, that the reaction mixture to be ketonized is first conducted over catalysts free from nickel and finally over particularly active nickel-containing catalysts.

It will be observed that the present invention contemplates a process for the production of ketones in which the mixed products containing ketonizable raw or initial substances are subjected to cracking before and/or during ketonization.

This case is a continuation-in-part of my copending application Serial No. 423,541, filed January 25, 1930.

I claim:

1. In the process for the production of ketones by the action of water-vapor on aliphatic alcohols with at least two carbon atoms joined together, at temperatures up to 500° C., in the presence of catalytically acting metal oxygen compounds; that improvement which consists in using catalysts containing essentially oxygen compounds of nickel in the presence of carriers containing iron, the nickel content not exceeding 20%.

2. In the process for the production of ketones by the action of water-vapor on aliphatic alcohols with at least two carbon atoms joined together, at temperatures up to 500° C., in the presence of catalytically acting metal oxygen compounds; that improvement which consists in using catalysts containing essentially oxygen compounds of nickel and cobalt in the presence of carriers containing iron, the content of nickel and cobalt not exceeding 20%.

3. In the process for the production of ketones by the action of water-vapor on aliphatic alcohols with at least two carbon atoms joined together, at temperatures up to 500° C., in the presence of catalytically acting metal oxygen compounds; that improvement which consists in using catalysts containing essentially oxygen compounds of nickel in the presence of carriers containing iron oxide, the nickel content not exceeding 20%.

4. In the process for the production of ketones by the action of water-vapor on aliphatic alcohols with at least two carbon atoms joined together, at temperatures up to 500° C., in the presence of catalytically acting metal oxygen compounds; that improvement which consists in using catalysts, containing essentially oxygen compounds of nickel and cobalt in the presence of carriers containing iron oxide, the content of nickel and cobalt not exceeding 20%.

5. In the process for the production of ketones by the action of water-vapor on aliphatic alcohols with at least two carbon atoms joined together, at temperatures up to 500° C., in the presence of catalytically acting metal oxygen compounds; that improvement which consists in using catalysts, containing essentially oxygen compounds of nickel and oxides of alkaline earth metals in the presence of carriers containing iron, the nickel content not exceeding 20%.

6. In the process for the production of ketones by the action of water-vapor on aliphatic alcohols with at least two carbon atoms joined together, at temperatures up to 500° C., in the presence of catalytically acting metal oxygen compounds; that improvement which consists in using catalysts, containing essentially oxygen compounds of nickel and cobalt and oxides of alkaline earth metals in the presence of carriers containing iron, the content of nickel and cobalt not exceeding 20%.

7. In the process for the production of ketones by the action of water-vapor on aliphatic alcohols with at least two carbon atoms joined together, at temperatures up to 500° C., in the presence of catalytically acting metal oxygen compounds; that improvement which consists in using catalysts, containing essentially oxygen compounds of nickel and oxides of alkaline earth metals in the presence of carriers containing iron oxide, the nickel content not exceeding 20%.

8. In the process for the production of ketones by the action of water-vapor on aliphatic alcohols with at least two carbon atoms joined together at temperatures up to 500° C., in the presence of catalytically acting metal oxygen compounds of metals selected from the group consisting of iron, cobalt and nickel; that improvement which comprises the use of catalysts, containing essentially oxygen compounds of nickel and cobalt and oxides of alkaline earth metals in the presence of carriers containing iron oxides, the content of nickel and cobalt not exceeding 20%.

9. In the process for the production of ketones by the action of water vapor on aliphatic alcohols with at least two carbon atoms joined together, at temperatures up to 500° C., in the presence of catalytically acting metal oxygen compounds; that improvement which comprises the use of catalysts containing essentially oxygen compounds of nickel in the presence of carriers containing iron, the nickel content not exceeding 20%.

10. A process for the production of ketones consisting in completely rusting spongy iron in damp air with weak acetic acid, saturating the iron with a solution of nickel carbonate in acetic acid, subsequently drying and heating at a temperature up to 500° C., the nickel carbonate amounting to approximately 10% in weight of the spongy iron and conducting a mixture of an aliphatic alcohol and water vapor over the catalyst.

11. The process set forth in claim 10 in which the catalyst contains an auxiliary catalyst obtained from nickel carbonate containing cobalt.

12. A process for the production of ketones which consists in completely rusting spongy iron in atmospheric oxygen, impregnating with a solution of nickel carbonate in acetic acid, and conducting a mixture of ethyl alcohol and water vapor over the catalyst, the weight proportions of the ethyl alcohol to water vapor being about 18830 kg. of the alcohol and 78400 of said vapors.

13. In the process for the production of ketones by the action of water-vapor on aliphatic aldehydes at temperatures up to 500° C., in the presence of catalytically acting metal oxygen compounds which comprises using catalysts containing essentially oxygen compounds of nickel and oxides of alkaline earth metals in the presence of carriers containing iron oxide, the nickel content not exceeding 20%.

14. In the process for the production of ketones by the action of water-vapor on aliphatic esters at temperatures up to 500° C., in the presence of catalytically acting metal oxygen compounds which comprises using catalysts containing essentially oxygen compounds of nickel and oxides of alkaline earth metals in the presence of carriers containing iron oxide, the nickel content not exceeding 20%.

15. In the process for the production of ketones by the action of water-vapor on first runnings of a spirit rectification up to 500° C., in the presence of catalytically acting metal oxygen compounds which comprises using catalysts containing essentially oxygen compounds of nickel and oxides of alkaline earth metals in the presence of carriers containing iron oxide, the nickel content not exceeding 20%.

16. In the process for the production of ketones by the action of water-vapor on mixtures of esters of various kinds up to 500° C., in the presence of catalytically acting metal oxygen compounds which comprises using catalysts containing essentially oxygen compounds of nickel and oxides of alkaline earth metals in the presence of carriers containing iron oxide, the nickel content not exceeding 20%.

17. In the process for the production of ketones by the action of water-vapor on high boiling esters of residual acids up to 500° C., in the presence of catalytically acting metal oxygen compounds which comprises using catalysts containing essentially oxygen compounds of nickel and oxides of alkaline earth metals in the presence of carriers containing iron oxide, the nickel content not exceeding 20%.

18. In the process for the production of ketones by the action of water-vapor on a member of the group consisting of aliphatic alcohols and ketonizable derivatives of aliphatic alcohols with at least 2 carbon atoms joined together at temperatures up to 500° C., in the presence of catalytically acting metal oxygen compounds which comprises using catalysts containing essentially oxygen compounds of nickel and oxides of alkaline with metals in the presence of carriers containing iron oxide, the nickel content not exceeding 20%.

WILHELM QUERFURTH.